United States Patent [19]

Bartholomew

[11] Patent Number: 4,807,913
[45] Date of Patent: Feb. 28, 1989

[54] HEAT BLOCKING JUNCTION

[75] Inventor: Donald D. Bartholomew, Marine City, Mich.

[73] Assignee: Proprietary Technology, Inc., Southfield, Mich.

[21] Appl. No.: 115,336

[22] Filed: Nov. 2, 1987

[51] Int. Cl.⁴ .............................................. F16L 17/02
[52] U.S. Cl. .................................... 285/369; 285/233
[58] Field of Search ............................. 285/369, 233

[56] References Cited

U.S. PATENT DOCUMENTS

| | | |
|---|---|---|
| 419,962 | 1/1890 | Lane . |
| 2,148,036 | 2/1939 | Pfefferle . |
| 2,329,000 | 9/1943 | Rembert . |
| 2,497,441 | 2/1950 | Detweiler .................. 285/233 |
| 2,532,773 | 12/1950 | Kellam . |
| 2,702,716 | 2/1955 | Basolo et al. . |
| 3,186,739 | 6/1965 | Mahoff et al. . |
| 3,223,438 | 12/1965 | De Cenzo ................ 285/369 X |
| 3,370,870 | 2/1968 | Mahoff . |
| 3,574,358 | 4/1971 | Cassel . |
| 3,873,138 | 3/1975 | Griffiths ................. 285/369 X |
| 3,902,747 | 9/1975 | Weinhold . |
| 4,288,108 | 9/1981 | Streit ..................... 285/369 X |
| 4,660,864 | 4/1987 | Ershiy .................... 285/369 X |

FOREIGN PATENT DOCUMENTS 1372390  8/1964  France ........................ 285/369

Primary Examiner—Dave W. Arola
Attorney, Agent, or Firm—Harness, Dickey & Pierce

[57] ABSTRACT

A junction adapted to transport fluid between hot and cold bodies is disclosed. The bodies include an inlet or an outlet having a mechanism to attach the junction. The attachment mechanisms include a retaining portion and a sealing portion. The junction includes a sleeve having an overall cylindrical tubular shape with two ends. Inwardly projecting peripheral flanges are positioned on each of the sleeve ends. Seals, adapted to be received by the sealing portion of the attachment members seal the sleeve with the body inlet and outlet. The sleeve peripheral flanges are adapted to be mechanically received by the attachment retaining portions such that the flanges contact the retaining portions along a peripheral line to minimize the heat transfer from the sleeve between the two bodies.

6 Claims, 1 Drawing Sheet

U.S. Patent     Feb. 28, 1989     4,807,913
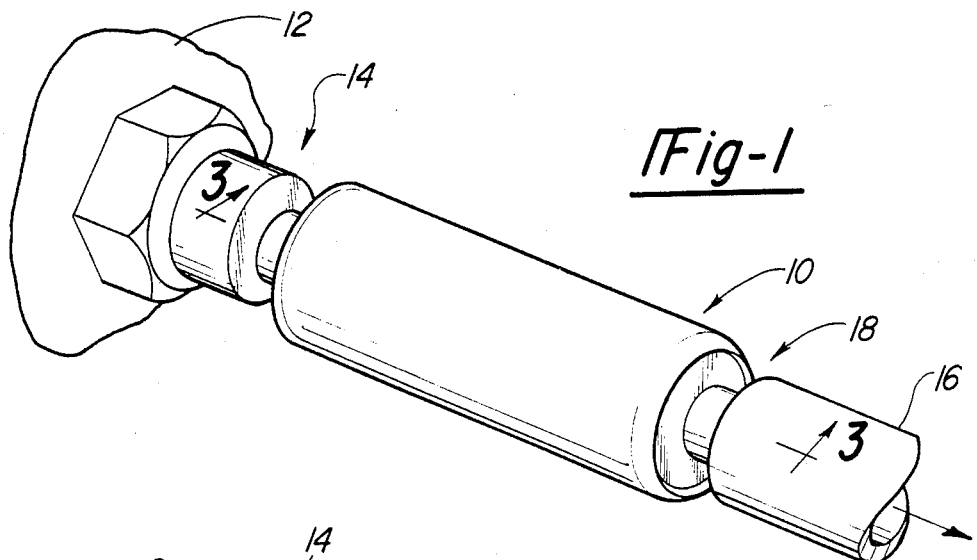
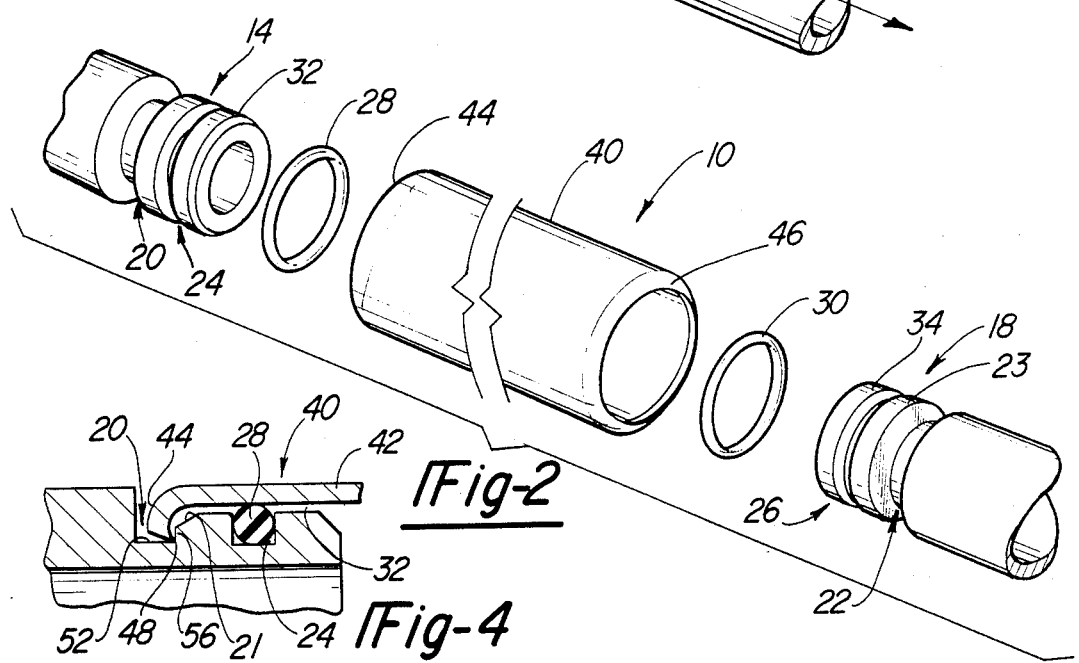
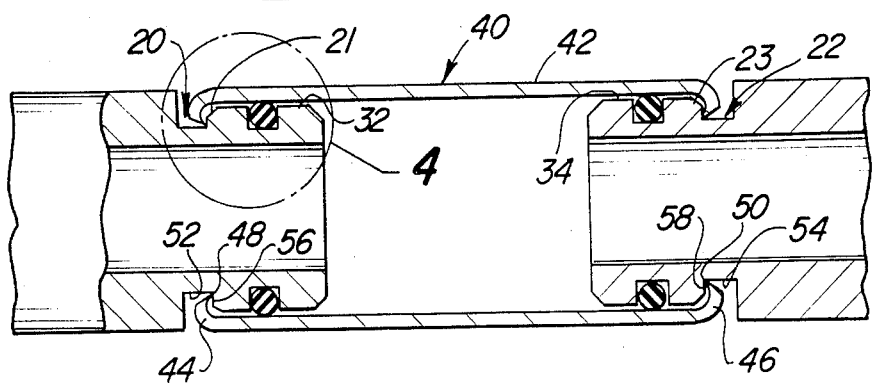

HEAT BLOCKING JUNCTION

BACKGROUND AND SUMMARY OF THE INVENTION

The present invention relates to conduit systems adapted to transport fluids or gasses between an inlet and outlet with a temperature difference between the inlet and the outlet.

In several types of applications, fluid or gasses is to be transported in a system from a hot connection to a cold connection or vice versa. In this type of system where the conduction of heat by the conduit causes damage, a device is needed in the system which blocks or slows the travel of the heat energy transferred between the two points. The art illustrates several types of connectors that are utilized to connect two points of a system together. Relevant art connectors are illustrated in the following U.S. Patents. U.S. Pat. Nos. 3,902,747; 3,574,358; 3,370,870; 3,223,438; 3,186,739; 2,702,716; 2,532,773; 2,329,000; 2,148,036; and 419,962.

The above art connectors, however, are not intended as devices which act to block the transfer of heat energy along the conduit. It is noted that the construction of some of these connectors will act as heat blockers if one were to exercise care in the design and construction to emphasize the heat blocking properties of the resulting device. It is also recognized that one or both ends of the heat blocking device may be a portion of a connector or element that affixes the conduit. One of the referenced patents involves a heat blocking sleeve disposed over the conduit to protect an elastomeric seal. The inventor observes that the construction is not a good conductor of heat energy (presumably because of the heat insulating ring that protects the elastomer seal), but the primary purpose of the connector is to allow swivelling and axial misalignment of the conduits which is beneficial in an automotive exhaust system.

Accordingly, it is an object of the present invention to provide a means of blocking a significant portion of the heat energy that is conducted by the conduit. The present invention provides the art for sealing the conduit ends while allowing minimal transfer of heat between the two conduits. The present invention provides the art with a junction having a sleeve with a peripheral line contact with the conduits to minimize the heat transfer between the sleeve and the conduit connections, and means of maintaining the pressure or vacuum confining properties of the conduit.

The present invention provides the art with a new and improved junction adapted to transport fluid or gasses between two bodies of different temperatures having an inlet and outlet. The inlet and outlet for the junction may each include a mechanism for attaching a connector portion if desired. The attachment mechanisms include a retaining portion and a sealing portion. The junction includes a sleeve having an overall cylindrical tubular shape with two ends. Inwardly projecting peripheral flanges are coupled with each of the sleeve ends. Seals are adapted to be received by the sealing portion of the attachment mechanisms to contact the sleeve to seal the inlet and outlet with the sleeve. The peripheral flanges are adapted to be mechanically received by the attachment mechanism retaining portions such that the flanges contact the retaining portions along a peripheral line for minimizing the heat transferred from the sleeve to the attachment mechanism.

From the subsequent description, which utilize portions of connectors for clarity, and appended claims taken in conjunction with the following drawings, other objects and advantages will become apparent to those skilled in the art.

It should be understood that the heat blocking junction is not intended as a connector, although as shown in may be used in conjunction with a connector or connectors.

BRIEF DESCRIPTION OF THE DRAWINGS

FIG. 1 is a perspective view of a heat blocking junction and connector in accordance with the present invention.

FIG. 2 is an exploded perspective view of FIG. 1.

FIG. 3 is a cross-section view of FIG. 1 taken along line 3-3 thereof.

FIG. 4 is an enlarged cross-section view of FIG. 3 within circle 4.

DETAILED DESCRIPTION OF THE PREFERRED EMBODIMENT

Referring to the figures, a heat blocking junction and connectors adapted to transport fluid between two bodies having different temperatures is illustrated and designated with the reference numeral 10. The junction 10 is coupled with a body 12 by inlet 14 and a body 16 by outlet 18. Generally, one of the bodies 12 or 16 has a temperature substantially greater than the other body such that the passage of heat from one body to the other tends to damage a connection that is made dirctly between the two bodies. The sleeve 40 enables a minimal amount of heat to transfer from one body to the other, protecting the connections.

Moving to FIGS. 2 through 4, a better understanding of the sleeve 40 may be procured. The inlet and outlet 14 and 18 are substantially identical and the below description will apply to both. Retaining portions 20 and 22, preferably peripheral grooves with an angle edge 21 and 23, are formed adjacent to bodies 12 and 16. The peripheral grooves 20 and 22 enable the sleeve 40 to be mechanically secured to the bodies 12 and 16. A sealing portion 24 and 26, preferably a peripheral groove, is formed on the inlet and outlet, 14 and 18 respectively, to receive sealing members 28 and 30.

The sealing members 28 and 30, preferably elastomeric O-rings, seal the sleeve 40 with the inlet and outlet, 14 and 18, against fluid leakage. The O-rings 28 and 30 are seated in the peripheral grooves 24 and 26 such that the O-rings 28 and 30 project above the peripheral surfaces 32 and 34 of the inlet and outlet 14 and 18, respectively, as seen in FIGS. 3 and 4. This projection of the O-rings 28 and 30 enables the sleeve 40 to contact the O-rings 28 and 30 to seal the sleeve 40 with respect to the inlet 14 and outlet 18 while avoiding contact with the peripheral surfaces 32 and 34 of the inlet 14 and outlet 18, as seen in FIG. 4.

The junction 10 is generally comprised of a sleeve 40 having a substantially cylindrical tubular shape. The sleeve 40 has a thin wall 42 which is formed from a thin wall material so that heat is relatively slowly transferred from the hotter body to the colder body. Peripheral flanges 44 and 46 are integrally formed at the ends of the sleeve 40 and project inwardly towards the center axis of the sleeve 40. The peripheral flanges 44 and 46 mechanically retain the sleeve 40 onto the retaining portions 20 and 22 of the inlet and outlet, 14 and 18, respectively. A peripheral line contact 48 and 50 is created between the flanges 44 and 46 and the inlet 14 and outlet 18, as seen in FIGS. 3 and 4. This peripheral line contact is located at the junction of the peripheral surface 52 and 54 and extending walls 56 and 58 of the grooves 20 and 22. The peripheral line contact enables the sleeve to transfer a minimal amount of heat energy between the two bodies 12 and 16 by reducing the surface area contact between the flanges 44 and 46 and inlet 14 and outlet 18. Thus, the heat transfer of the sleeve 40 reduces the heat conducted between the hot and cold bodies.

It will be noted that the sleeve 40 may be manufactured in any desired length and diameter to provide minimum heat transfer energy between the two bodies. Further, the sleeve 40 may be manufactured from metallic and nonmetallic materials which provide desired properties.

While the above detailed description fulfills the objectives of the present invention, it will be noted that modifications, variations and alterations may be made to the present invention without deviating from the scope and fair meaning of the subjoined claims.

What is claimed is:

1. A junction, adapted to transport fluid between an inlet body and an outlet body having a temperature difference, comprising:
    said inlet and outlet bodies each including means for attaching said junction, said means including a retaining portion and a sealing portion;
    said junction comprising a sleeve having an overall cylindrical tubular shape with a substantially constant wall thick cylindrical with two ends, an integral downwardly inwardly projecting peripheral flange on each of said ends;
    sealing means adapted to be received by said sealing portion of attachment means, said sealing means contacting said sleeve for sealing said inlet and outlet bodies with said sleeve; and
    said sleeve peripheral flanges adapted to be mechanically received by said retaining portions of said attachment means such that said flanges contact said retaining portions along a peripheral line to reduce heat transfer between the inlet and outlet bodies when the inlet and outlet bodies are at different temperatures.

2. The junction according to claim 1 wherein said sleeve is comprised of a thin tubular wall integral with said inwardly projecting peripheral flanges.

3. The junction according to claim 1 wherein said sealing means is comprised of a pair of elastomeric O-rings for sealing said sleeve with said attachment means against leakage.

4. The junction according to claim 3 wherein said elastomeric O-rings project above said inlet and outlet bodies such that said sleeve is prevented from contacting said inlet and outlet bodies about the sealing area and said sleeve only contacting said inlet and outlet bodies along said peripheral line contact.

5. A junction, adapted to transport fluid between an inlet body and an outlet body having a temperature difference, comprising:
    said inlet and outlet bodies each including means for attaching said junction, said means including a retaining portion and a sealing portion;
    said junction comprising a sleeve having an overall cylindrical tubular shape with two ends, an integral downwardly inwardly projecting peripheral flange on each of said ends, said flanges having tapered ends coming to a point when viewed in cross-section;
    sealing means adapted to be received by said sealing portion of attachment means said sealing means contacting said sleeve for sealing said inlet and outlet bodies with said sleeve; and
    said sleeve peripheral flanges adapted to be mechanically received by said retaining portions of said attachment means such that said pointed tapered ends of said flanges contact said retaining portions along a peripheral point line to reduce heat transfer between the inlet and outlet bodies when the inlet and outlet bodies are at different temperatures.

6. A junction, adapted to transport fluid between an inlet body and an outlet body having a temperature difference, comprising:
    said inlet and outlet bodies each including means for attaching said junction, said means including a retaining portion and a sealing portion;
    said junction comprising a sleeve having an overall cylindrical tubular shape with two ends, an integral downwardly inwardly projecting peripheral curled edge on each of said ends, said curled edges being tapered to form a point when viewed in cross-section;
    sealing means adapted to be received by said sealing portion of attachment means, said sealing means contacting said sleeve for sealing said inlet and outlet bodies with said sleeve; and
    said sleeve peripheral edges adapted to be mechanically received by said retaining portions of said attachment means such that said downwardly inwardly curled edge points contact said retaining portions along a peripheral point line to reduce heat transfer between the inlet and outlet bodies when the inlet and outlet bodies are at different temperatures.

* * * * *